W. E. BRELSFORD.
ANTISKID DEVICE.
APPLICATION FILED FEB. 19, 1920.
1,412,040.
Patented Apr. 11, 1922.
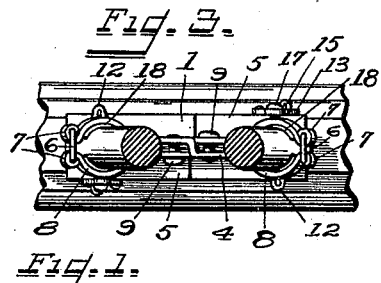
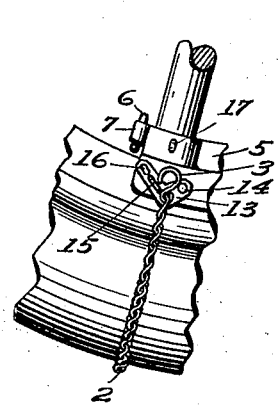
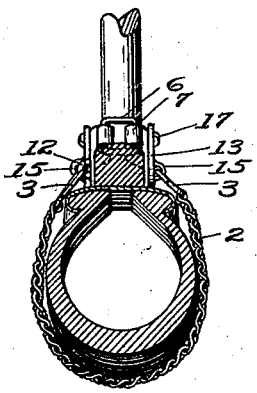
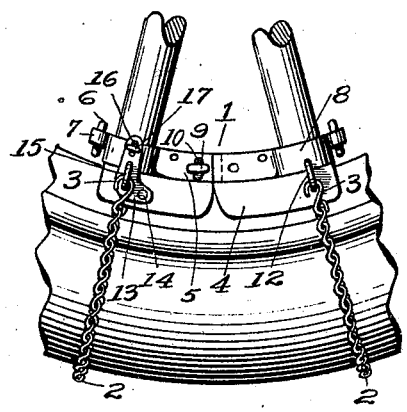
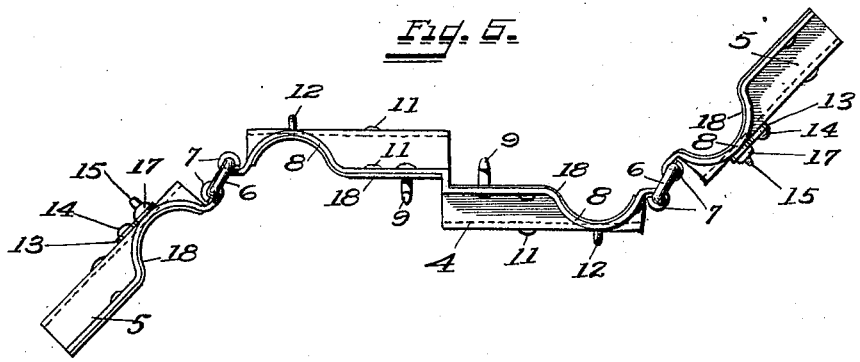
Inventor
William E. Brelsford.
Atty.

UNITED STATES PATENT OFFICE.

WILLIAM E. BRELSFORD, OF MENDOTA, ILLINOIS.

ANTISKID DEVICE.

1,412,040.    Specification of Letters Patent.    Patented Apr. 11, 1922.

Application filed February 19, 1920. Serial No. 359,816.

*To all whom it may concern:*

Be it known that I, WILLIAM E. BRELSFORD, a citizen of the United States, and a resident of Mendota, in the county of La Salle, State of Illinois, have invented certain new and useful Improvements in Antiskid Devices, of which the following is a full, clear, and exact description, reference being had to the accompanying drawing, forming part of this specification.

My invention relates to devices which are primarily intended to be attached to the wheel structure of an automobile, and to which chains may be attached, the chains passing over the tire after the usual manner of anti-skid chains.

One object of my invention is to provide a device which may be easily and quickly attached to the wheel structure, and which may also be easily detached therefrom, and which will not injure the finish or appearance of the parts to which it has been attached.

Another object of my invention is the provision of a simple and substantial means for attaching the cross-chains to the device, and for detaching them therefrom, when desired.

Other objects of my invention will appear and be described in the specification.

The novelty of my invention will be hereinafter more fully set forth and specifically pointed out in the claims.

In the accompanying drawing;

Figure 1 is a side elevation of a portion of an automobile wheel showing my device attached thereto.

Figure 2 is an end view of Fig. 1.

Figure 3 is a plan view of Fig. 1.

Figure 4 is a side view of a portion of the device showing some of the parts in a different position from that shown in Fig. 1.

Figure 5 is a plan view of the bracket portion of the device, showing the same detached from the wheel and extended ready for reattachment.

The same numerals of reference are used to indicate identical parts in all the figures.

In its preferred form of construction my invention comprises a bracket portion 1 and a pair of cross-chains 2, each of which is provided with a hook 3 at each end. The bracket portion comprises the main member 4 and two auxiliary members 5 which are preferably connected to the main member by links 6, the main and auxiliary members being formed as at 7 to engage the links 6.

The main member is formed to engage opposite sides of two adjacent spokes of the wheel, these portions being shown at 8, that portion of the main member which extends between the two spoke engaging portions being preferably formed somewhat after the fashion of a channel iron with an upstanding central rib which is offset at its center, the flange and web of the channel being cut away on opposite sides at opposite ends as shown in Fig. 5, the auxiliary members 5 being so formed as to fill the places cut away from the main members and complete the channel section when the auxiliary members are in the positions they occupy when the device is attached to the wheel.

The main member 4 is provided with turn buttons 9 which pass through suitably shaped openings 10 in the auxiliary members and which, when turned, after the auxiliary members are in proper position, hold and lock these members in place.

The interior surfaces of the main and auxiliary members, or those surfaces which come in contact with any portion of the wheel when the device is attached thereto, are provided with a felt or other suitable lining 18 to prevent injury to the wheel structure during the use of the device, and this lining may be held in place by any suitable means such as rivets 11, though these linings may be cemented or otherwise held in place.

The spoke engaging portions of the main member 4 each carry an eye or loop 12 which is adapted to receive one of the hooks 3 to the cross-chains 2, and each auxiliary member carries a tension device which comprises a bell-crank 13 which is pivotally mounted as at 14 to the auxiliary member, and which carries an eye or loop 15, similar to the loops 12 previously described and adapted to receive one of the hooks 3 of the cross-chains 2. Each of the bell-cranks 13 is perforated as at 16 to pass over a turn-button 17 carried by the auxiliary member 5. The connection of the bell-crank 13 to the auxiliary member 5 is sufficiently loose to permit the end which carries the perforation 16 to be moved with relation to the turn-button 17 a distance sufficient to permit of its disengagement from the turn-button, to the end that the bell-crank 13 may be swung to the position shown in Fig. 4, so that after one of the hooks 3 has been engaged with the loop 12, the hook on the opposite side of the cross-chain may be engaged with the loop 15 of the bell-crank 13, after which the bell-crank may be moved to a position where its perforated end may be moved to a position where its perforated end may be engaged with the turn-button 17, which movement will take up the excess length of the cross-chain and hold it in proper operating relation to the tire of the wheel after which the turn-button 17 is turned to hold the bell-crank 13 in the position shown in Fig. 1.

To release the cross-chain it is only necessary to operate the turn-button 17 to release the bell-crank 13 after which it may be removed to the position shown in Fig. 4, and the cross-chain unhooked, whereupon if it is desired to remove the bracket portion of the device from the wheel the turn buttons 9 may be operated to release the auxiliary members 5 and the bracket portion removed from the wheel, though if desired the bracket portion of the device may be left on the wheel, the bell-crank 13 reengaged with the turn-button 17 so that when it is desired to again attach the cross-chains, they may be attached as previously described.

Having thus fully described my invention I claim:

1. In an anti-skid device the combination of a spoke and felly engaging member comprising oppositely arranged spoke and felly engaging portions, a pair of duplicate clamping members oppositely arranged and carried by the spoke and felly engaging member, and means for clamping the latter members in engaging position on a wheel structure.

2. In an anti-skid device the combination of a spoke and felly engaging member provided with oppositely arranged spoke and felly engaging portions, a clamping member hinged to each end of the spoke and felly engaging member, a pair of turn buttons carried by the spoke and felly engaging member, one of which engages each of the clamping members, and a cross chain carried by the device and passing around the tread of the tire of the wheel structure.

WILLIAM E. BRELSFORD.